United States Patent [19]
Phillips

[11] Patent Number: 5,424,664
[45] Date of Patent: Jun. 13, 1995

[54] DIRECT DIGITAL SYNTHESIZER WITH ADJUSTABLE CLOCK FREQUENCY

[75] Inventor: Donald E. Phillips, Cedar Rapids, Iowa

[73] Assignee: Rockwell International Corporation, Seal Beach, Calif.

[21] Appl. No.: 86,477

[22] Filed: Jul. 2, 1993

[51] Int. Cl.$^6$ .............................................. H03L 7/16
[52] U.S. Cl. ................................... 327/106; 327/107; 327/131
[58] Field of Search ................... 328/14, 140, 138; 307/271, 260, 529, 113; 327/105, 106, 107, 131

[56] References Cited

U.S. PATENT DOCUMENTS

| | | | |
|---|---|---|---|
| 3,842,354 | 10/1974 | Dunne | 328/14 |
| 4,514,696 | 4/1985 | Genrich | 328/14 |
| 4,752,902 | 6/1988 | Goldberg | 328/14 |
| 5,084,681 | 1/1992 | Kovalick et al. | 328/14 |
| 5,151,661 | 9/1992 | Caldwell et al. | 328/14 |
| 5,179,848 | 1/1993 | Thompson | 328/14 |

Primary Examiner—Timothy P. Callahan
Assistant Examiner—My-Trang Nu Ton
Attorney, Agent, or Firm—Kyle Eppele; M. Lee Murrah; H. Fredrick Hamann

[57] ABSTRACT

An adjustable digital synthesizer has frequency increments of a selected step size. The adjustable digital synthesizer includes a digital accumulator having N stages. The digital accumulator counts at a predetermined clock frequency such that, in response to each clock, the accumulator increments the step size determined by the digital input. The accumulator counts to $2^{Nth}$ state and wraps around in response to an overflow. An adder, responsive to the overflow, adds an offset to the accumulator, the offset being a function of the difference between $2^{Nth}$ times the minimum step size and the desired clock frequency.

4 Claims, 1 Drawing Sheet

DIRECT DIGITAL SYNTHESIZER WITH ADJUSTABLE CLOCK FREQUENCY

FIELD OF THE INVENTION

The present invention relates generally to digital frequency synthesizers and, more particularly, to such an apparatus employing a digital accumulator circuit having an adjustable clock frequency.

BACKGROUND OF THE INVENTION

In the field of radio communications systems, there has been a continuing goal to design a simple low-cost frequency synthesizer that can provide a large library of discrete frequencies over a very wide frequency spectrum. Direct digital frequency synthesis is a digital technique of frequency synthesis that is often used in phase modulation, frequency modulation and frequency hopping schemes in spread spectrum communications. This technique is advantageous because of the high speed at which the output frequency can be changed, the small frequency step size that it makes available, and the ability to digitally control the phase or frequency. A circuit arrangement using this technique is referred to as a Direct Digital Synthesizer or "DDS".

The output frequency of a DDS is represented as a digital output and is determined by an input digital frequency control word, which can be generated by a logic device such as a digital processor or computer. Many modulation schemes can be implemented with a DDS. These schemes include, among others, FSK (frequency shift keying), FM (frequency modulation), and PM (phase modulation). Thus, the output frequency of a DDS can be frequency modulated according to the information digitized by the logic device, for example, using FSK modulation. In addition to the FSK modulation, the window of modulated frequencies can hop, thereby moving the window of modulated frequencies in a coded scheme to avoid jamming or decoding by unauthorized transceivers. The agility and the frequency resolution of the DDS makes it superior to other types of synthesizers in such an application and gives an unauthorized transceiver less time to lock onto the correct frequency. Naturally, the authorized receiver must hop to the correct frequency to receive the modulated information. A logic device in the receiver generates the correct digital control word for the receiver's DDS and subsequent down-conversion, demodulation, and decoding.

Typically, a DDS includes a digital accumulator, which is configured as a digital integrator, using a latch and full adder with the output sum at each accumulator stage and the input digital frequency control word as inputs to the adder. The frequency word determines the step size by which the accumulated sum is incremented. Each step represents a step or increment in phase and in corresponding frequency.

In an accumulator having "N" carryover summing stages, for instance, the clock frequency into the DDS is $2^{Nth}$ times the frequency difference represented by each step or increment in phase. Thus, all the frequencies are not sub-multiples of the clock frequency, and an accumulator overflow occurs with varying remainders left in the accumulator corresponding to the difference between the clock frequency and the closest multiple of the step.

Present DDS circuits require a clock frequency that is $2^N$ times the frequency increment, such as:

$$2^{20} \times 10 \text{Hertz} = 10.48576 \text{ Hertz},$$

where N is 20 and 10 Hertz is the frequency increment to obtain a clock frequency of 10.48576 Hertz. It is difficult to obtain such a convenient clock frequency without requiring specialized circuits which are slow in getting initialized.

Accordingly, there is a need for a DDS with a conveniently adjustable clock frequency.

SUMMARY OF THE INVENTION

The present invention provides a DDS having a convenient and easily-implemented adjustable clock frequency. This technique overcomes the problems of the prior-art and can be implemented using a minimal amount of off-the-shelf compensation circuitry while causing virtually no delay in obtaining the frequency adjustment.

In one embodiment, the present invention is realized as an adjustable DDS having frequency increments of a selected step size. The synthesizer includes a digital accumulator having N stages and receives a digital input and provides a digital output. The digital accumulator counts at a predetermined clock frequency such that, in response to each clock signal, the accumulator increments the step size determined by the digital input. The accumulator counts to $2^{Nth}$ state and "wraps-around" in response to an overflow. In response to the overflow, an adder adds an offset to the accumulator, the offset being a function of the difference between $2^{Nth}$ times the minimum step size and the desired clock frequency.

The above summary is not intended to describe each aspect of the present invention, as this is the purpose of the discussion below.

DETAILED DESCRIPTION OF THE SPECIFIC EMBODIMENTS

Figure 1:
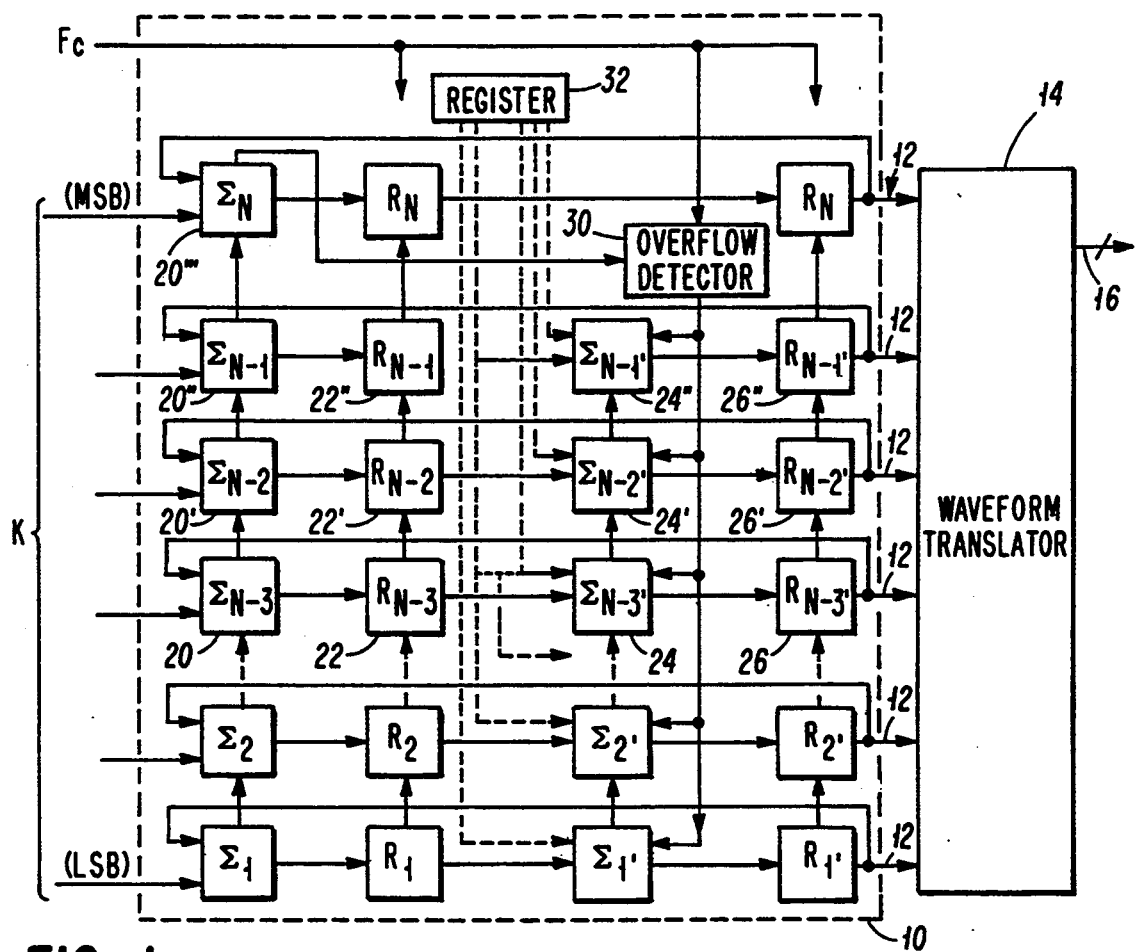
FIG. 1 is a circuit diagram of a DDS including an N-stage DDS accumulator and a waveform translator circuit, according to the present invention.

Turning now to the drawings and particularly to FIG. 1, a DDS is shown to include an accumulator 10 and a waveform translator circuit 14. An input digital frequency control word (K) is used to set the reference frequency for the DDS and also the minimum step size. The accumulator 10 generates an output 12, in the form of a digital word, which addresses the inputs of the waveform translator Circuit 14. The output 16 of the waveform translator circuit 14 is a digital word representing the magnitude of a 360° sine wave, which is used to establish the output frequency of the DDS of FIG. 1.

In accordance with the present invention, the accumulator 10 includes N rows (or stages) of carryover summing circuits. Each summing circuit includes a first full adder 20, a first register 22, a second full adder 24 and a second register 26. These circuits are cascaded with the registers 22, 26 being clocked by a frequency clock $F_c$, so that the first full adder 20 provides a carry-over to the first full adder 20' of the next (above) row after "1" at its input has been clocked through both registers 22, 24. Until the accumulator 10 counts to $2^{Nth}$ state, the adding function of the second adder 24 is disabled by the output of an overflow detector 30, which is activated in response to a carryover from the first adder 20' of the Nth top row. In other words, during normal operation, the output of the second adder 24 is a mirror image of its input. Thus, assuming that the accumulator 10 has its input (K) set for the smallest reference frequency (i.e., K=000 . . . 001), then the carryover from the first adder 20 in the first of the N rows will not occur until the maximum count of $2^N$ is exceeded. The carryover from the first adder in each row is used as the carry-in of the next (above) row, so as to provide a digital integration of the frequency clock $F_c$.

In response to detecting a carryover from the first adder 20''' of the Nth row, the overflow detector 30 adds an offset to the second adder, which prevents the accumulator 10 from counting to its maximum ($2^N$ times the increment), which is greater than the desired maximum clock frequency, during the subsequent cycle.

More specifically, when this carryover is detected, the overflow detector 30 enables the adding function of the second adder, thereby forcing the second adder to add in a programmed offset. A register 32 provides the programmed offset as a digital offset word comprising N bits, with one of the N bits arranged as an input to each of the N second adders 24. Consequently, the accumulator begins counting at a number equal to the offset rather than zero, thereby forcing the accumulator 10 to count from the offset to its maximum ($2^N$ times the increment).

By choosing the offset to be equal to the difference between $2^{Nth}$ minus the desired clock frequency divided by the minimum step size, the total count for the accumulator 10 corresponds exactly to the desired clock frequency. The only difference between the desired waveform for the desired clock frequency and the waveform represented by the sequence of digital words at the output of the accumulator is that the latter waveform has a cycle that is shortened.

Figure 2:
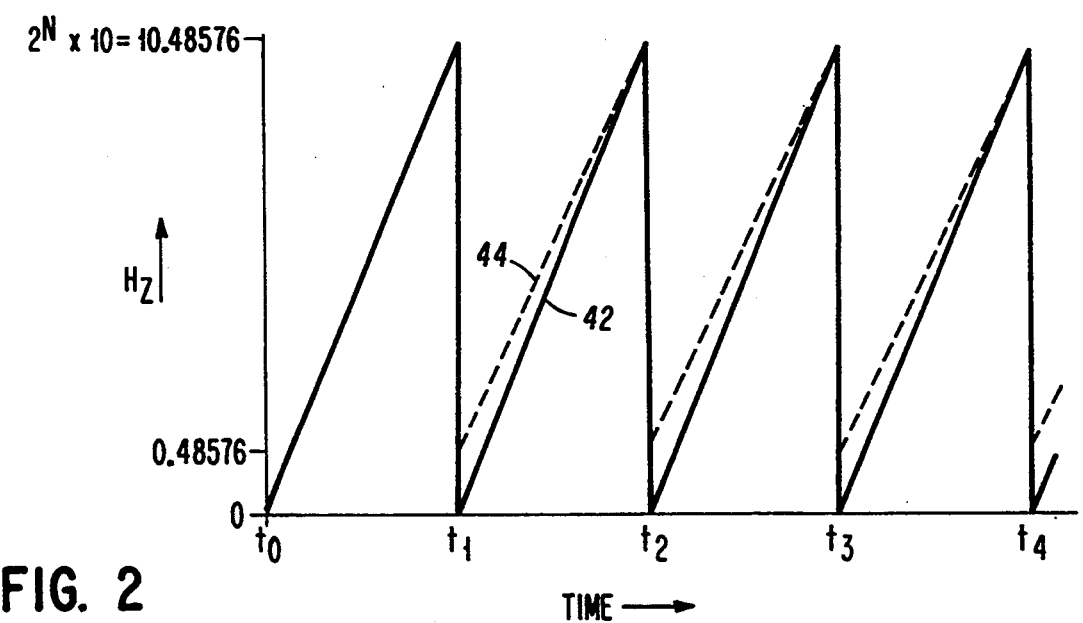
FIG. 2 is a graph showing the unmodified and modified outputs of the DDS accumulator of FIG. 1.

The above described process is illustrated in FIG. 2. It should be noted that all values used in the following example are for illustration only and should not be construed as limitations of the present invention. FIG. 2 shows the unmodified shortened output 42 (represented by the solid line) of the accumulator 10 of FIG. 1 in which the desired clock frequency is 10.48576 Hertz, N is 20 and the frequency increment is 10 Hertz. The unmodified output 42 begins its cycle at the same time $t_1$ as the desired waveform 44 (represented by the dashed line) for the desired clock frequency, but ends at a time less than $t_2 - t_1$, which accumulates over time to be significantly less than the full 360° phase of the desired clock frequency.

To compensate for this undesired truncation, the output 12 (of FIG. 1) is translated by the waveform translator 14, which is preferably implemented using memory means such as a ROM-type device having a look-up table. The memory means is programmed so that in response to the output accumulator presented to the memory means address inputs, the memory means provides an output effecting a translation of the sequence of digital words at the output 12 (waveform 42) to a sinusoidal wave having a period which corresponds to the waveform 44 of FIG. 2. Use of the term "sinusoidal," refers to sine and cosine waves and any phase shift thereof. This permits use of a conventional oscillator circuit to obtain the desired frequency increment desired for the synthesizer, without requiring specialized circuits and circuits which are slow in getting initialized.

Those skilled in the art will readily recognize that various modifications and changes may be made to the present invention without departing from the true spirit and scope thereof, which is set forth in the following claims.

I claim:
1. An adjustable digital synthesizer having frequency increments of a selected step size, comprising:
   a digital accumulator having an overflow detector, N stages of carry-over summing circuits, and receiving a digital input and providing an output; and
   the digital accumulator counting at a predetermined clock frequency such that in response to each clock the accumulator increments the step size determined by the digital input;
   said accumulator stages of carry-over summing circuits each comprised of a first adder;
   a first register coupled to an output signal derived from counting to the $2^{Nth}$ state, of the first adder;
   a second adder coupled to an output signal of the first register;
   a second register coupled to an output signal of the second adder; and
   said second adder responsive to a signal from the overflow detector and in cooperate with a third register for adding an offset digital word to said accumulator summing circuit, said offset digital word being a function of the difference between $2^{Nth}$ times the minimum step size and the desired clock frequency.

2. A digital synthesizer, according to claim 1, further including a look-up table receiving the output signal of the digital accumulator.

3. A digital synthesizer, according to claim 2, wherein the look-up table is programmed to provide an output word converting the output signal of the digital accumulator to a sinusoidal wave corresponding to a predetermined counting range of the digital accumulator reduced by the offset digital word.

4. A digital synthesizer, according to claim 1, wherein said digital input determines the step size.

* * * * *